United States Patent
Ahmed

(10) Patent No.: US 8,221,169 B2
(45) Date of Patent: Jul. 17, 2012

(54) FANNING MODULE, FANNING STRIP, AND CABLE MANAGEMENT PANEL

(75) Inventor: Foad Abdulakdir Mohamed Ahmed, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/881,969

(22) Filed: Sep. 14, 2010

(65) Prior Publication Data

US 2011/0111646 A1    May 12, 2011

Related U.S. Application Data

(60) Provisional application No. 61/242,598, filed on Sep. 15, 2009.

(51) Int. Cl.
*H01R 9/22* (2006.01)

(52) U.S. Cl. ........................................ 439/719; 361/826

(58) Field of Classification Search ................ 174/72 A, 174/97, 101, 608.1, 608.3; 211/26; 361/825, 361/826; 385/134–137; 439/719
See application file for complete search history.

(56) References Cited

U.S. PATENT DOCUMENTS

| | | | | |
|---|---|---|---|---|
| 4,392,344 A | * | 7/1983 | Gordon et al. | 59/78.1 |
| 4,658,577 A | * | 4/1987 | Klein | 59/78.1 |
| 4,972,576 A | * | 11/1990 | Sloppy et al. | 29/884 |
| 5,586,012 A | * | 12/1996 | Lerman | 361/826 |
| 6,263,136 B1 | * | 7/2001 | Jennings et al. | 385/48 |
| 6,381,393 B1 | | 4/2002 | Matthews et al. | |
| 6,463,728 B1 | * | 10/2002 | Daoud | 59/78.1 |
| 6,728,461 B1 | * | 4/2004 | Senatore et al. | 385/135 |
| 7,119,282 B2 | * | 10/2006 | Krietzman et al. | 174/101 |
| 7,534,958 B2 | * | 5/2009 | McNutt et al. | 174/68.1 |
| 7,634,874 B2 | * | 12/2009 | Lucas | 52/108 |
| 7,695,323 B2 | * | 4/2010 | McGrath et al. | 439/719 |

* cited by examiner

*Primary Examiner* — Thanh Tam Le

(74) *Attorney, Agent, or Firm* — Merchant & Gould P.C.

(57) ABSTRACT

A cable management fanning module includes an elongated base extending in a linear direction defining a longitudinal axis, and having a first end and an opposite second end. A plurality of cable retainers extend from the base, wherein each cable retainer includes a finger extending from the base to a distal end. The first and second ends of the base define an interlocking arrangement having reciprocal shapes, wherein the fanning module is mateable with additional fanning modules on one or both of the first and second ends having a reciprocal shape so as to form a fanning strip.

15 Claims, 20 Drawing Sheets

FANNING MODULE, FANNING STRIP, AND CABLE MANAGEMENT PANEL

CROSS-REFERENCE TO RELATED APPLICATIONS

This application claims the benefit of U.S. Provisional Application Ser. No. 61/242,598, filed Sep. 15, 2009; which application is incorporated herein by reference.

FIELD

This disclosure pertains to signal transmission systems with signals carried over optical fibers. More particularly, this disclosure pertains to cable management fanning strips and fiber distribution modules and frames.

BACKGROUND

A variety of cable management devices exist for managing cables extending to and from optical fiber terminations and other equipment. U.S. Pat. No. 6,381,393 illustrates one example management panel which includes fanning strips for cable management. Not withstanding prior design efforts, the telecommunications industry is in continued need of new designs of optical fiber distribution and management equipment.

SUMMARY

According to one aspect of the disclosure, a cable management fanning module includes an elongated base extending in a linear direction defining a longitudinal axis, and having a first end and an opposite second end. Multiple cable retainers extend from the base. Each cable retainer includes a finger extending from the base to a distal end. The first and second ends of the base define an interlocking arrangement having reciprocal shapes. The fanning module is mateable with another fanning module on one of the first and second ends having a reciprocal shape to the other of the first and second ends.

According to another aspect of the disclosure, a fanning strip includes a base defining a longitudinal axis and multiple cable retainers extending from the base. The fanning strip includes at least two fanning modules which interlock to form the fanning strip. In one example, all of the cable retainers extend from a single side of the fanning strip. In certain embodiments, the fingers extend away from the base and have an end which extends at least partially back toward the base.

DETAILED DESCRIPTION

Figure 1:
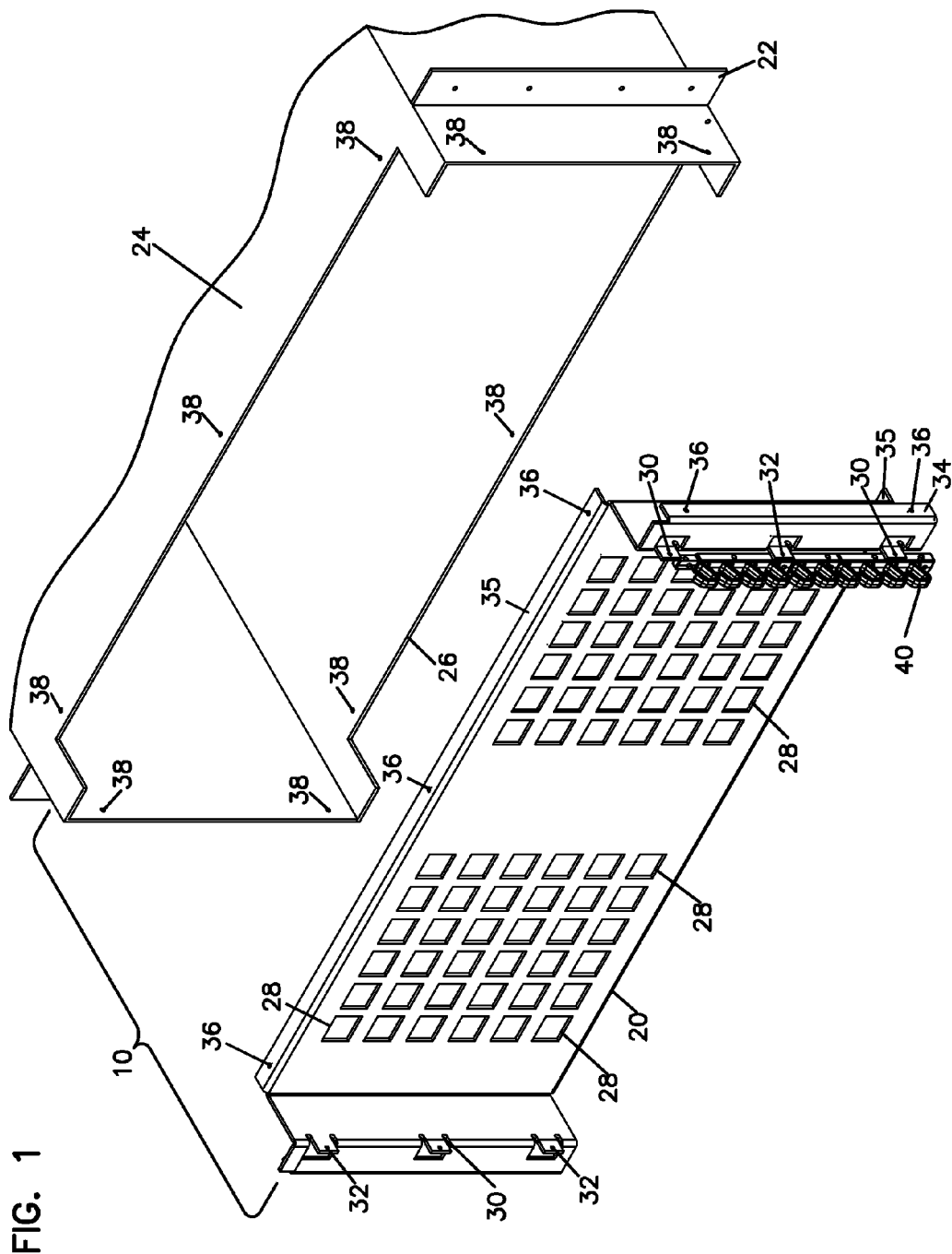
FIG. 1 is a perspective view of a fiber optic panel including a fanning strip in accordance with one embodiment of the present disclosure.
Figure 2:
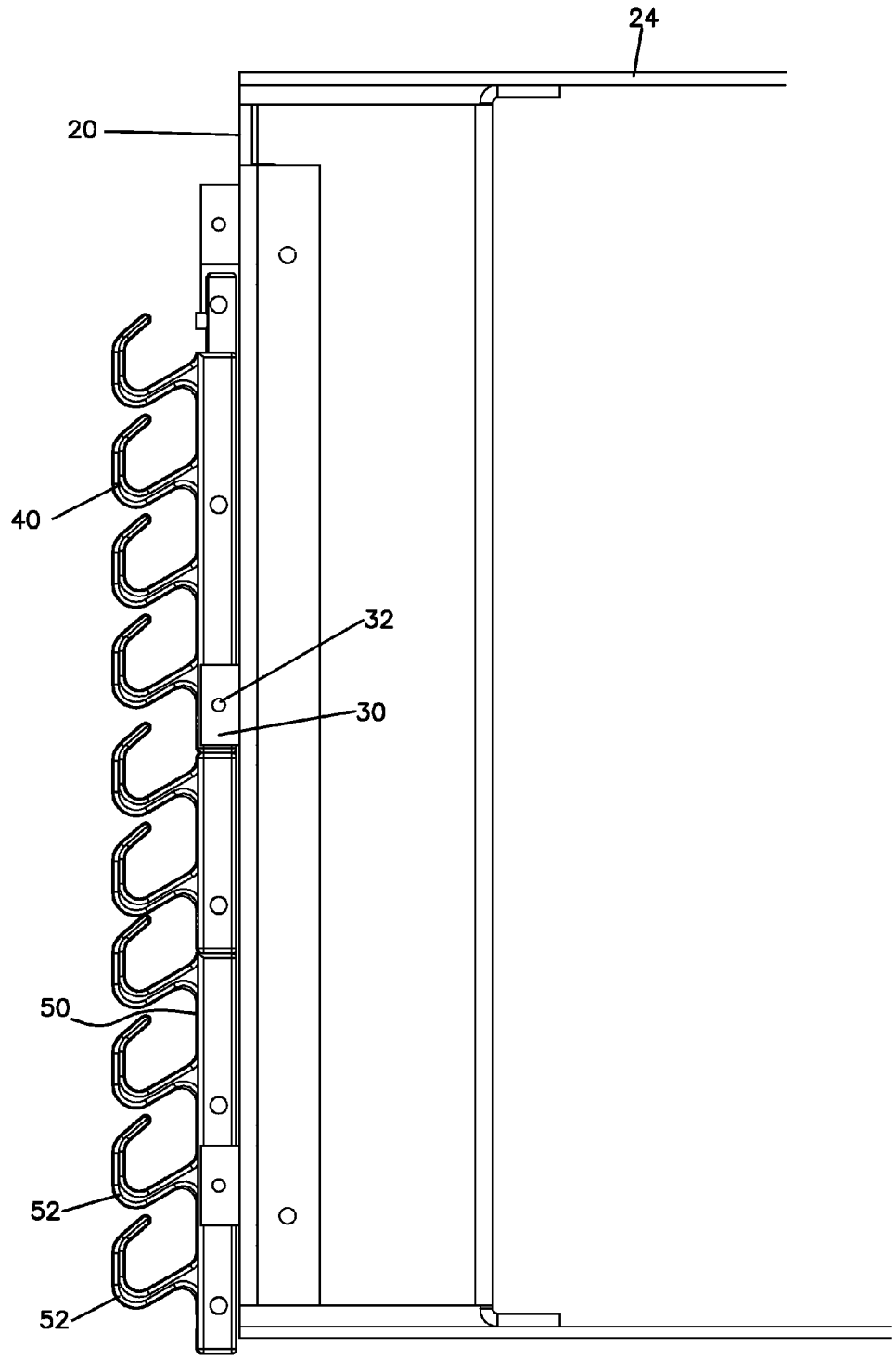
FIG. 2 is a side view of the panel of FIG. 1.

Referring now to the Figures, a first example embodiment of a telecommunications panel 10 is shown. Panel 10 includes a chassis 24 defining an open front end 26. Panel 10 also includes a front panel 20 that closes the front end 26 of the chassis 24. The panel 10 includes flanges 22 with which the panel 10 is configured to be mounted to a telecommunications rack. For example, flanges 22 can extend outwardly from the chassis 24. The chassis 24 also defines openings 38. The front panel 20 includes side flanges 34 and horizontal flanges 35 that define openings 36. Fasteners (not shown) can be inserted through openings 36 in the front panel 20 and into openings 38 in the chassis 24 to secure the front panel 20 to the chassis 24.

The front panel 20 defines openings 28 that are configured to receive fiber optic adapters, such as SC adapters. The adapters are used to connect fiber optic connectors that terminate fiber optic cables. The front panel 20 also includes brackets 30 for mounting a fanning strip 40 to the front panel 20. The fanning strip 40 is configured to facilitate cable/fiber routing to adapters mounted to the front panel 20. In the illustrated embodiment, panel 20 can include a fanning strip 40 mounted on each end of panel 20. In other embodiments, greater or fewer fanning strips 40 can be mounted to the front panel 20.

Referring now to FIGS. 3-20, fanning strip 40 includes cable retainers 42 extending from a base 44. The base 44 defines and extends generally linearly along a longitudinal axis 46. In some embodiments, the base 44 defines holes 60. Fasteners (not shown) can be inserted through holes 60 defined in the base 44 of the fanning strip 40 and into holes 32 defined in the brackets 30. In other embodiments, the fanning strip 40 can be snap-fit, bonded, or otherwise mounted to the brackets 30.

Figure 5:
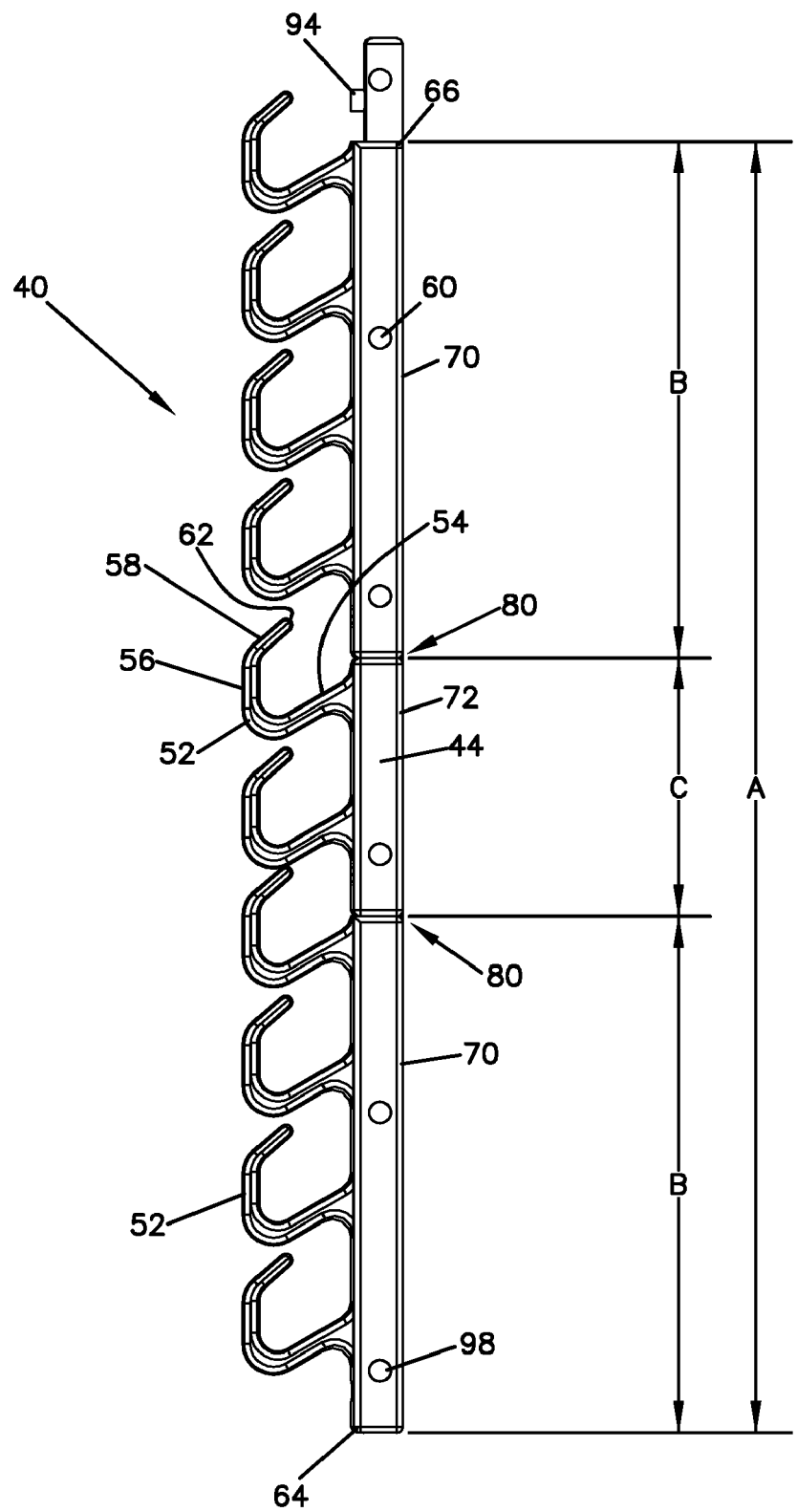
FIG. 5 is a side view of the fanning strip of FIG. 3, the opposite side being identical.
Figure 6:
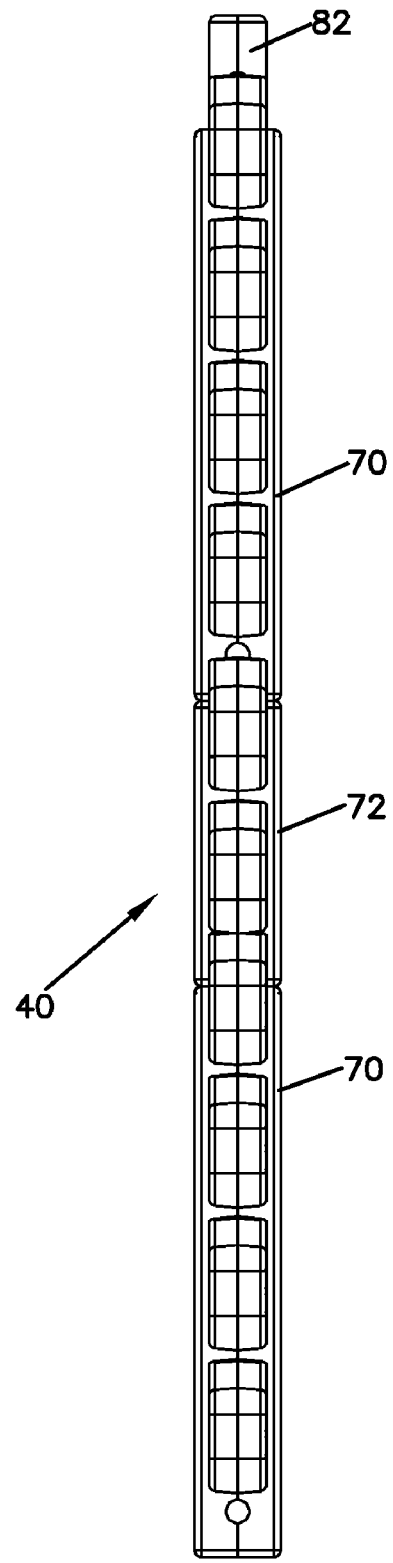
FIG. 6 is a front view of the fanning strip of FIG. 3.
Figure 7:
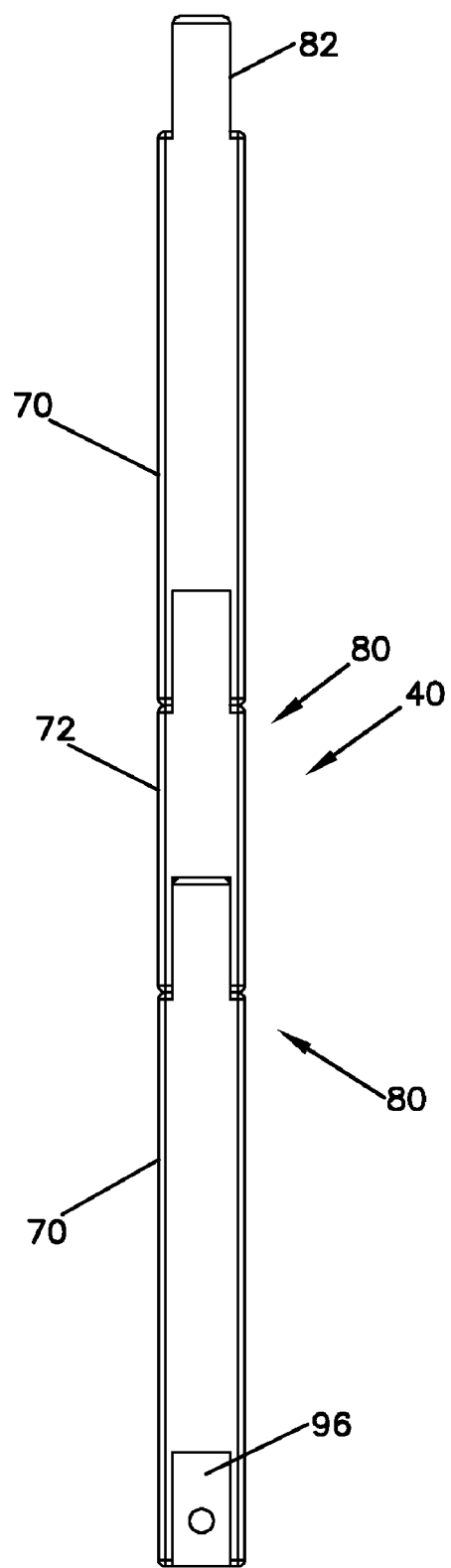
FIG. 7 is a rear view of the fanning strip of FIG. 3.
Figure 8:
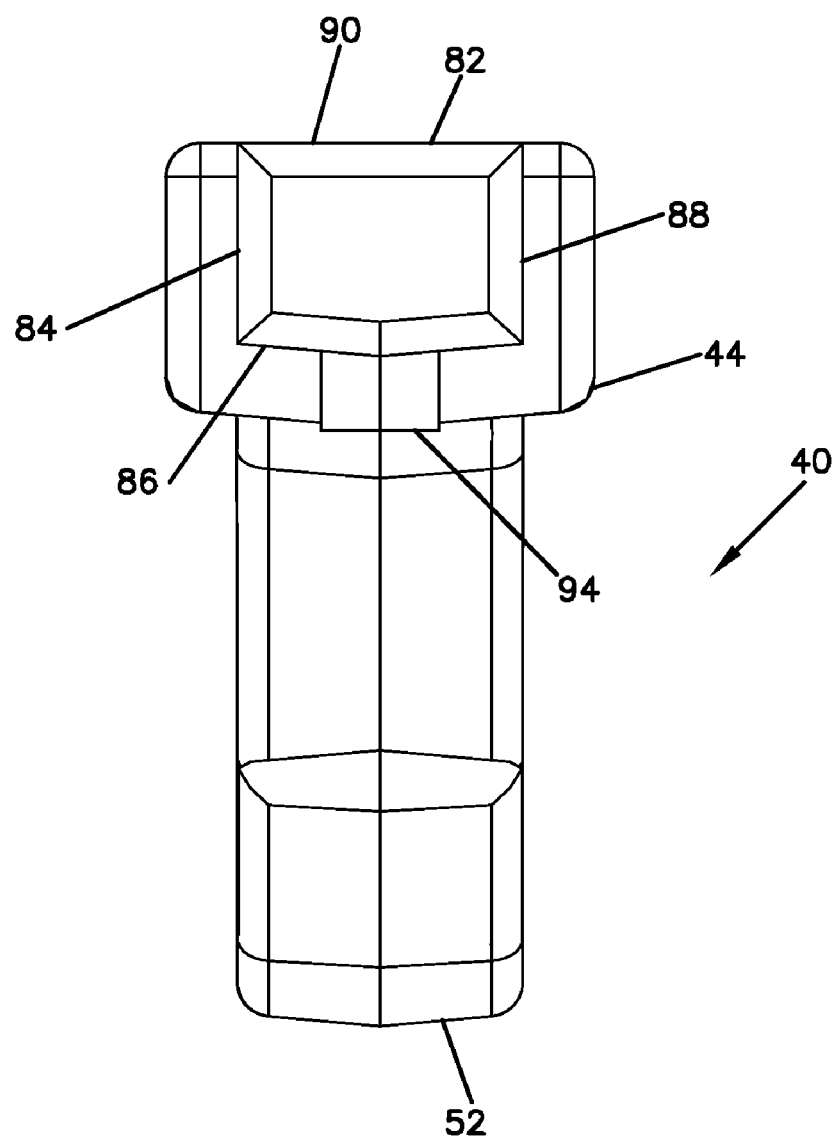
FIG. 8 is a top view of the fanning strip of FIG. 3.
Figure 9:
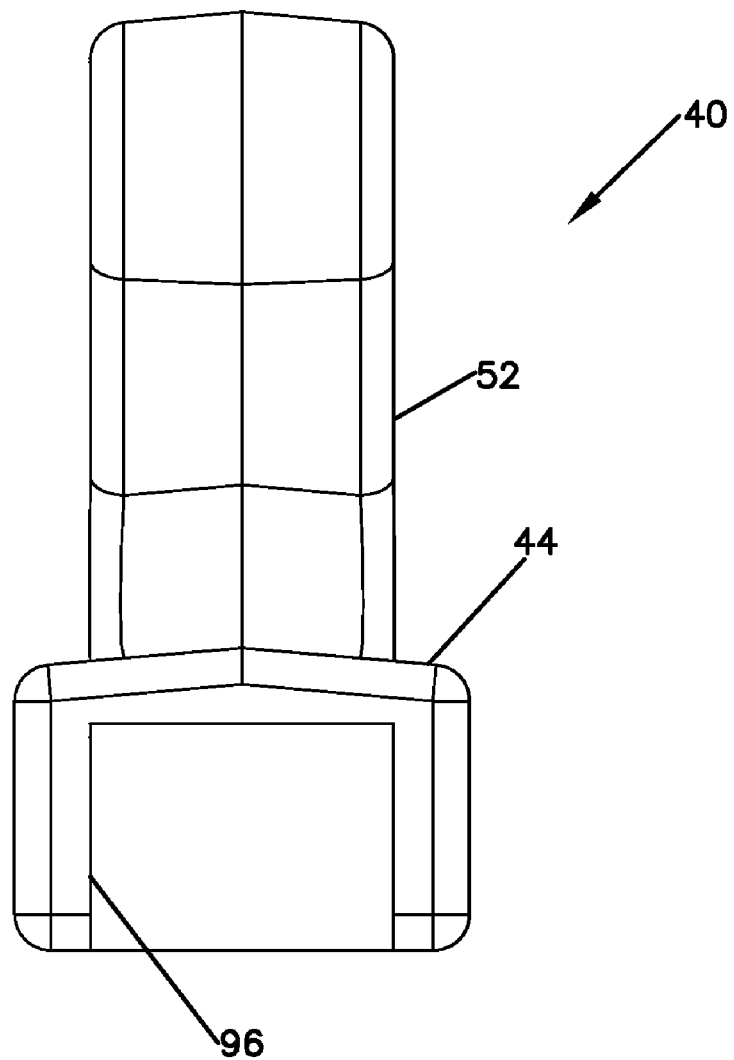
FIG. 9 is a bottom view of the fanning strip of FIG. 3.

The cable retainers 42 define fingers 52, which extend outwardly from a front surface 50 of the base 44. The fingers 52 are flexible relative to the base 44 to enable cables/fibers to be inserted or removed from between the fingers 52 and the base 44. Each finger 52 includes an extending portion 54, a vertical portion 56, and an angled portion 58, which extends at least partially back toward the base 44 (see FIG. 5). In other embodiments, however, different finger shapes are possible. As shown, a tip 62 of each finger 52 is positioned adjacent to the extending portion 54 of an adjacent finger 52 (FIG. 5).

A variety of lengths for fanning strip 40 might be desired as the panel height varies with different telecommunication panels 10. In accordance with aspects of the disclosure, the fanning strip 40 can be made from one or more separate modules or components that are assembled together. Each module includes at least one finger 52 extending outwardly from a base 44. As shown in FIG. 5, the fanning strip 40 has a length A extending along the longitudinal axis 46 from first end 64 to second end 66. The length A of the fanning strip 40 can be made longer or shorter by using additional or fewer fanning modules, as will be described below. Accordingly, the length A of each fanning strip 40 can be customized to the height of the panel 20 to which the fanning strip 40 is to be mounted.

In the example shown in FIGS. 3-10, the fanning strip 40 includes three fanning modules assembled together. Other example fanning strips 40 can include greater or fewer fanning modules. In some embodiments, each fanning module within a fanning strip 40 has the same length. In other embodiments, however, a fanning strip can be assembled from fanning modules having different sizes. A first example fanning module 70 is shown in FIGS. 11-15. The first example fanning module 70 includes four fingers 52 and has a length B. A second example fanning module 72 is shown in FIGS. 16-20. The second example fanning module 72 includes two fingers 52 and has a length C. Other example fanning modules can include greater or fewer fingers 52.

In accordance with some aspects of the disclosure, the same type (e.g., size) of fanning module can be used multiple times within one fanning strip 40. For example, the fanning strip 40 shown in FIGS. 3-10 includes a first example fanning module 70 assembled to either side of a second example fanning module 72. Accordingly, as shown in FIG. 5, the length A of the fanning strip 40 is equal to about two times the length B of the first fanning module 70 plus the length C of the second fanning module 72 (i.e., A=B+C+B).

To assemble fanning strip 40 from multiple fanning modules 70, 72, an interlocking arrangement 80 is provided. It is to be appreciated that a fanning strip 40 having a desired length can be made from combinations of fanning modules. For example, in some embodiments, fanning strips 40 having desired lengths may be assembled from first fanning modules 70, second fanning modules 72, or combinations of both. In other embodiments, other types and/or sizes of fanning modules can be utilized. Once assembled, the fanning strip 40 is mountable to brackets 30 of the panel 20.

Each fanning module 70, 72 includes a projection or tip 82 having a smaller profile than the base 44. The tip 82 includes four sides 84, 86, 88, 90 (e.g., see tip 82 shown in FIGS. 3 and 4). Sides 84 (FIGS. 3) and 88 (FIG. 4) of tip 82 define tip holes 92. Side 86 (FIG. 3) includes a post 94 extending outwardly from the base 44 transversely to axis 46. Side 90 is generally coplanar with a rear surface 48 of the base 44. An opposite end 95 from tip 82 of fanning module 70, 72, includes a pocket or socket 96 (see FIG. 4). The pocket 96 defines side holes 98 and a front hole 100.

Figure 3:
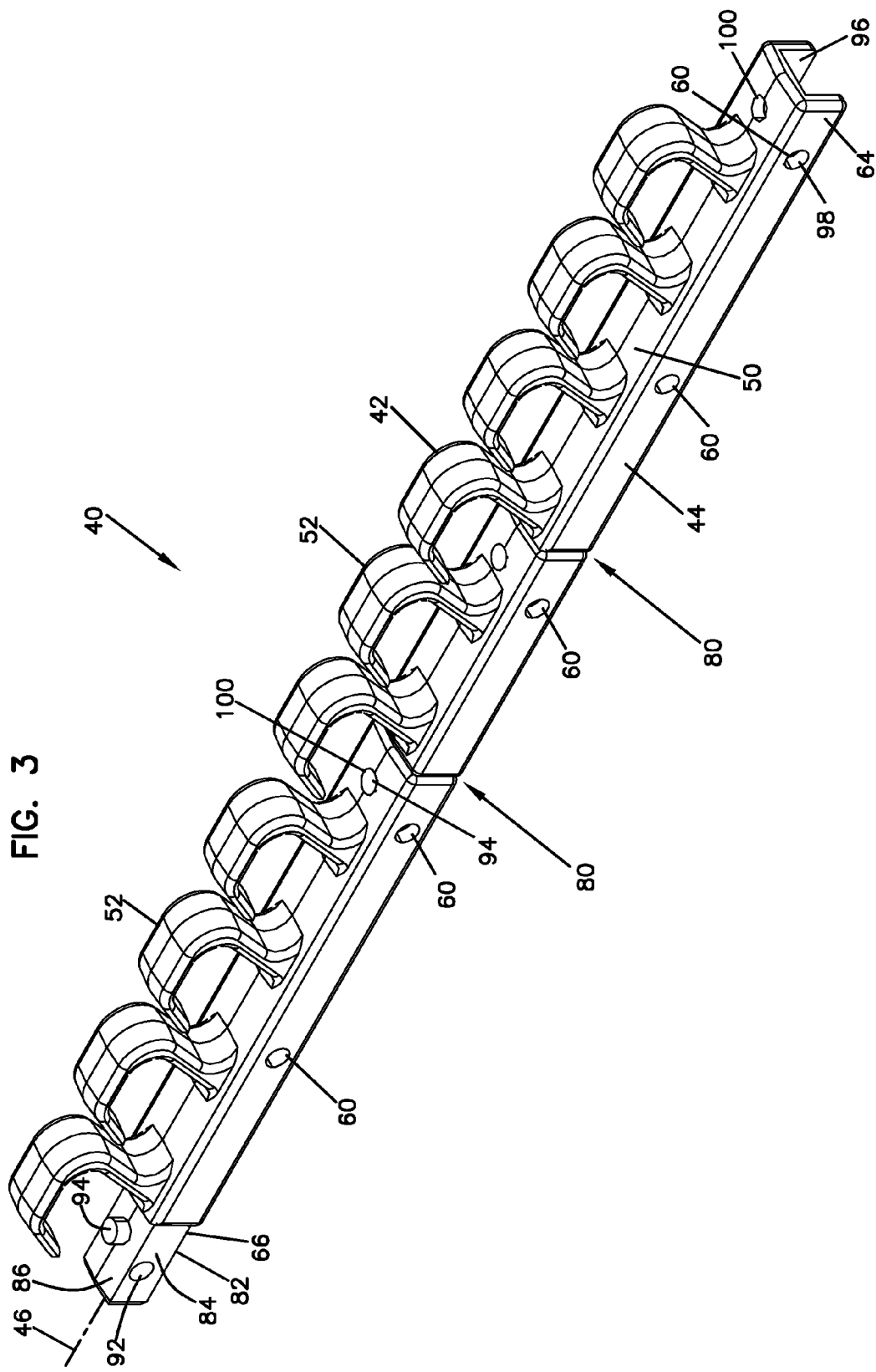
FIG. 3 is a first perspective view of the fanning strip of FIGS. 1 and 2.
Figure 4:
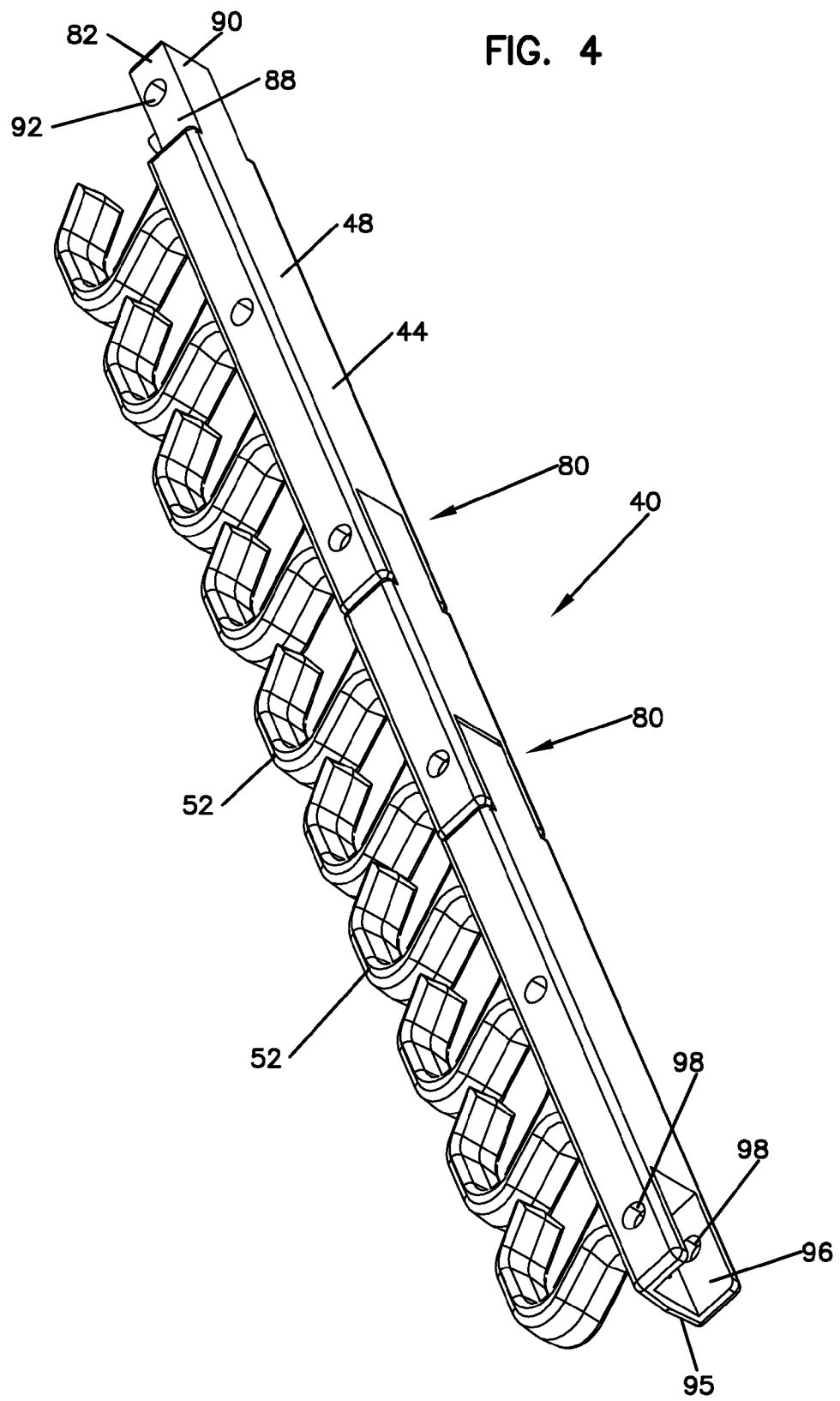
FIG. 4 is a further perspective view of the fanning strip of FIG. 3.
Figure 10:
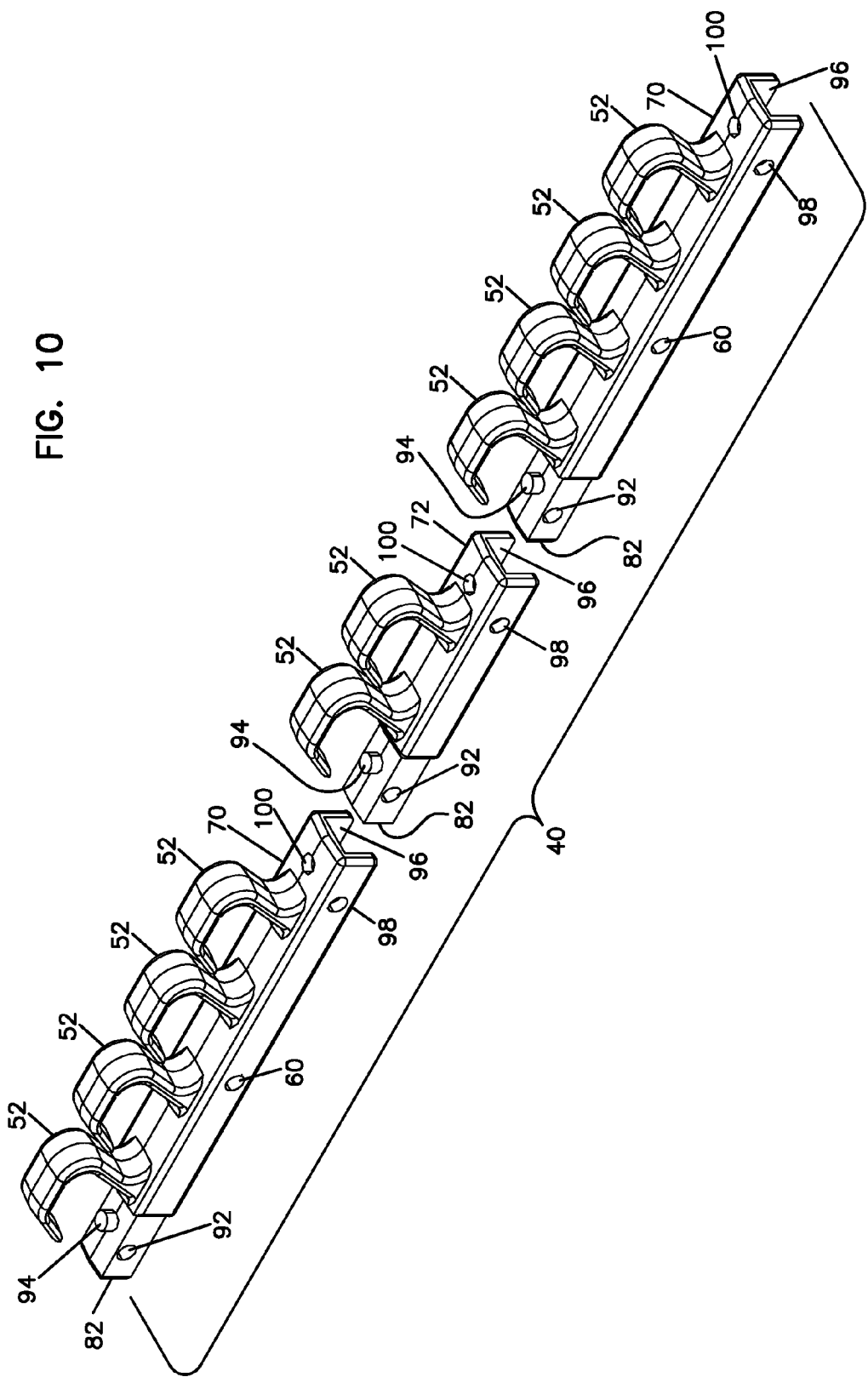
FIG. 10 is an exploded perspective view of the fanning strip of FIG. 3.
Figure 11:
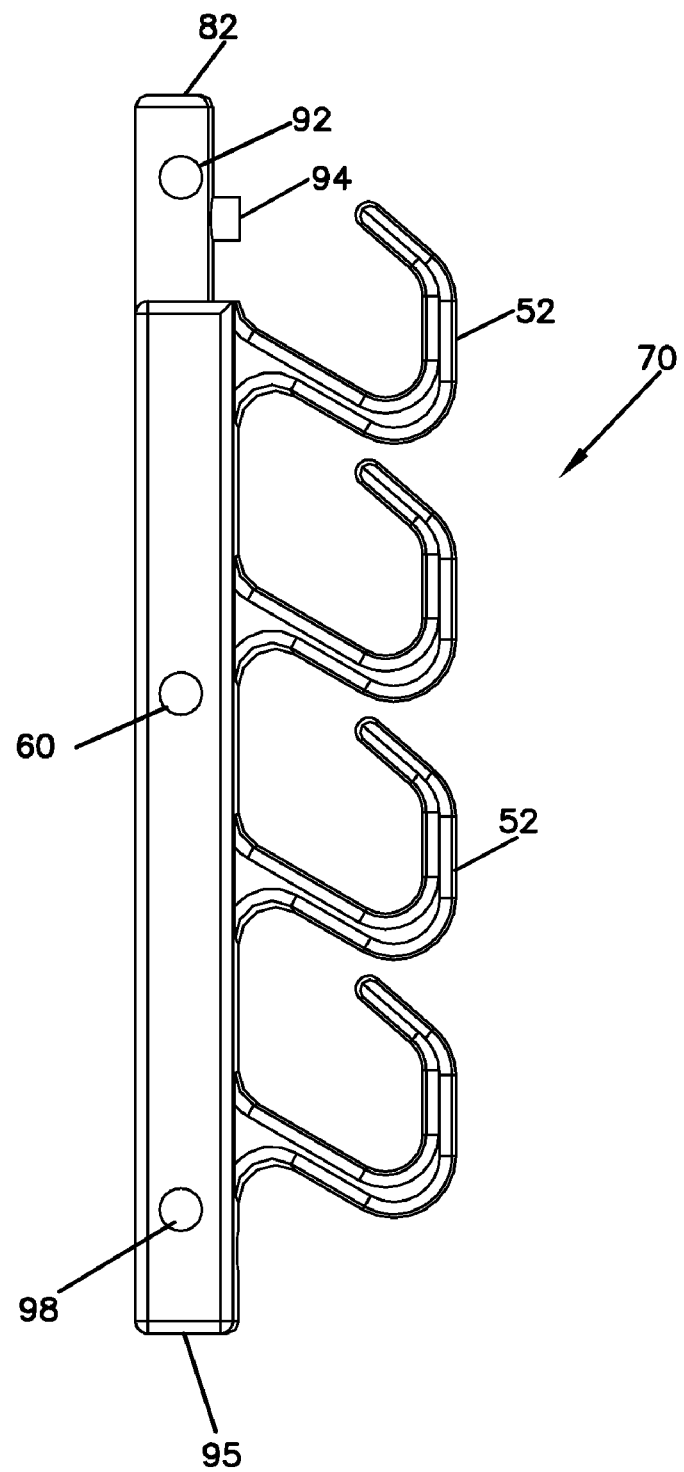
FIG. 11 is a side view of one of the fanning strip modules used to assemble the fanning strip of FIG. 3.
Figure 12:
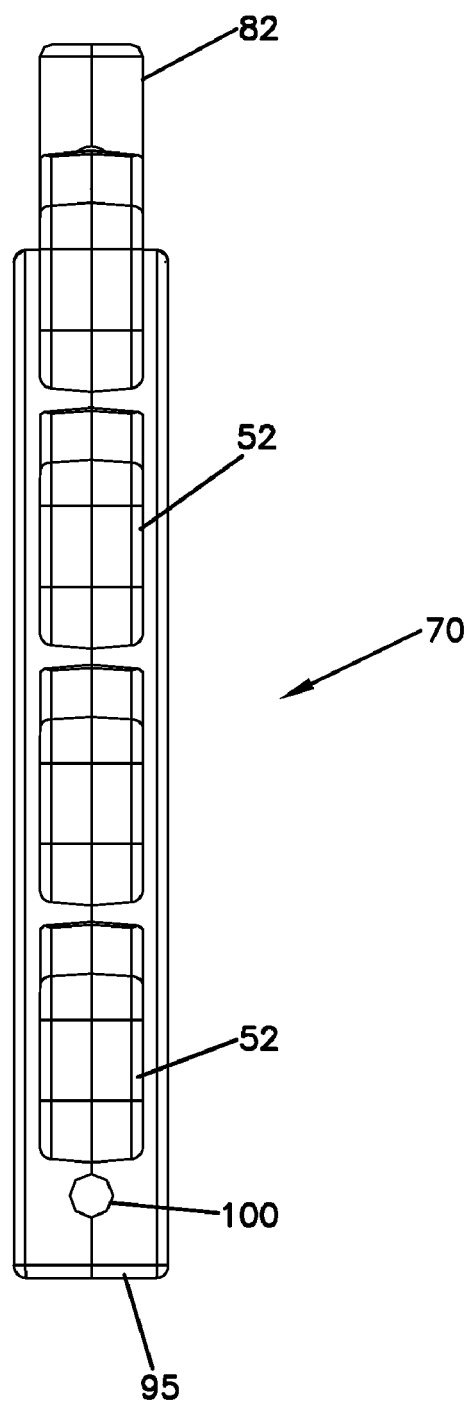
FIG. 12 is front view of the fanning strip module of FIG. 11.
Figure 13:
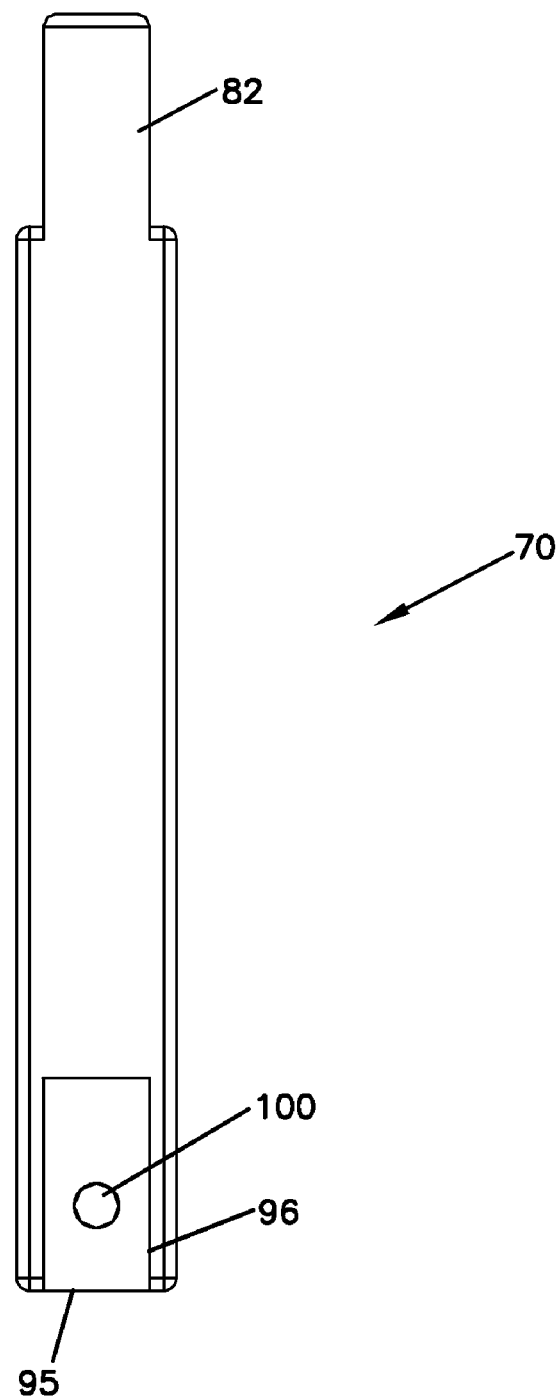
FIG. 13 is a rear view of the fanning strip module of FIG. 11.
Figure 14:
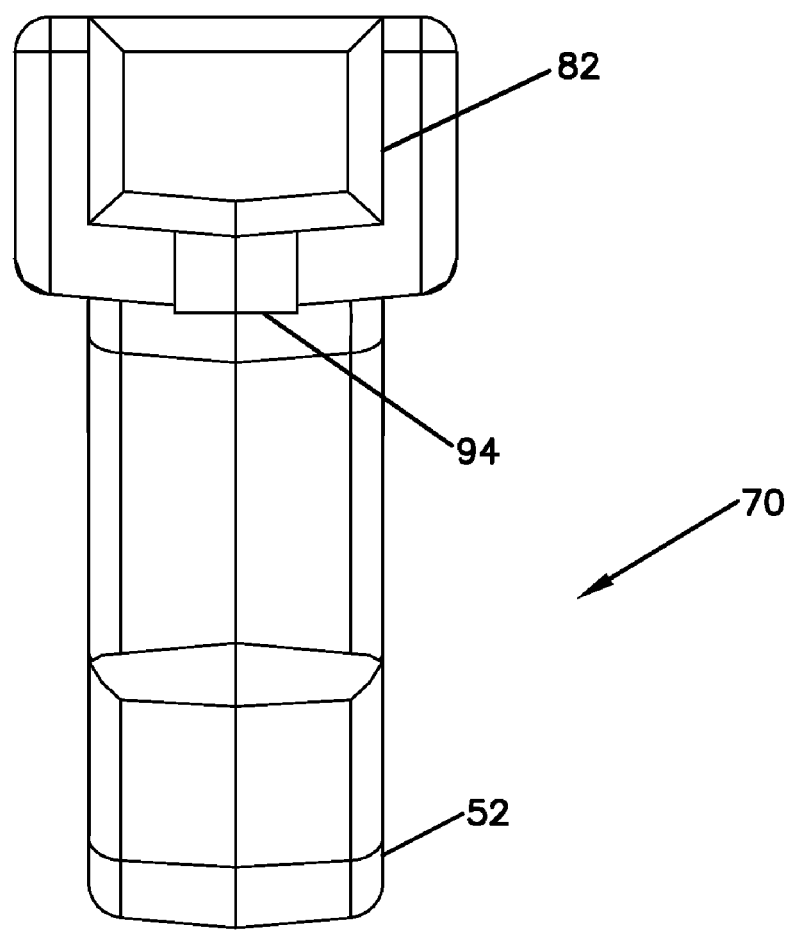
FIG. 14 is a top view of the fanning strip module of FIG. 11.
Figure 15:
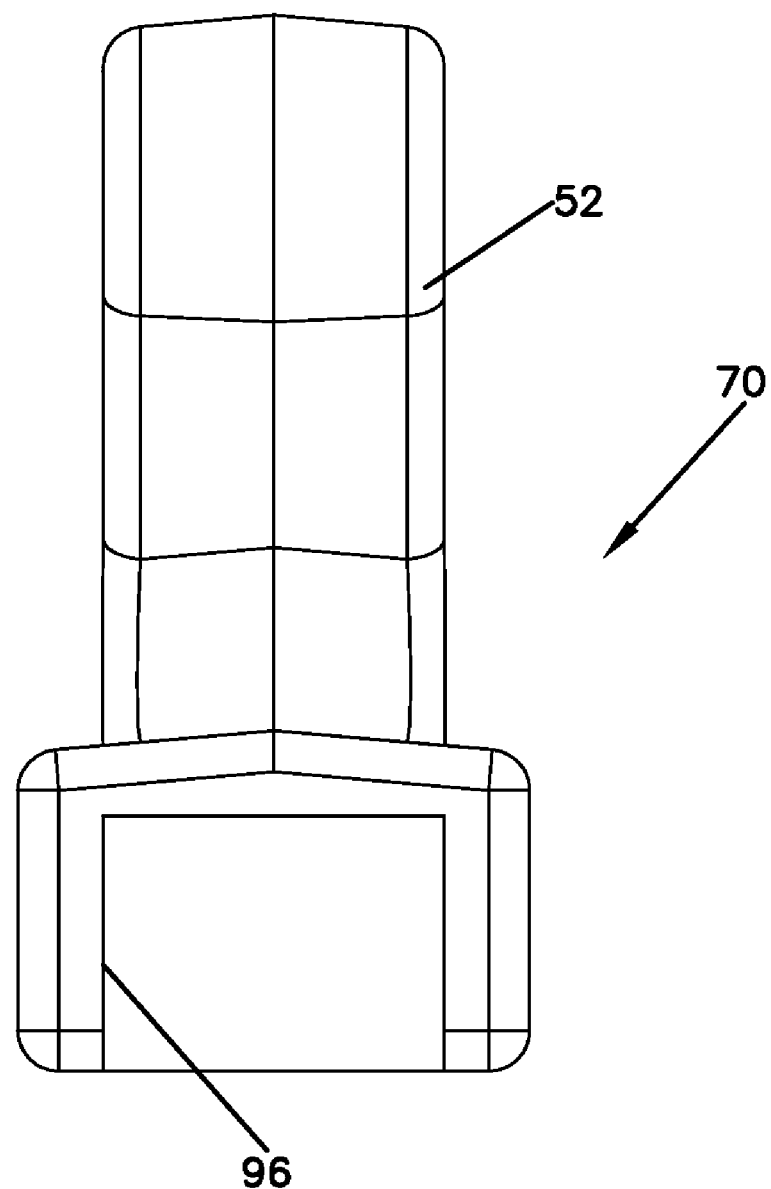
FIG. 15 is a bottom view of the fanning strip module of FIG. 11.
Figure 16:
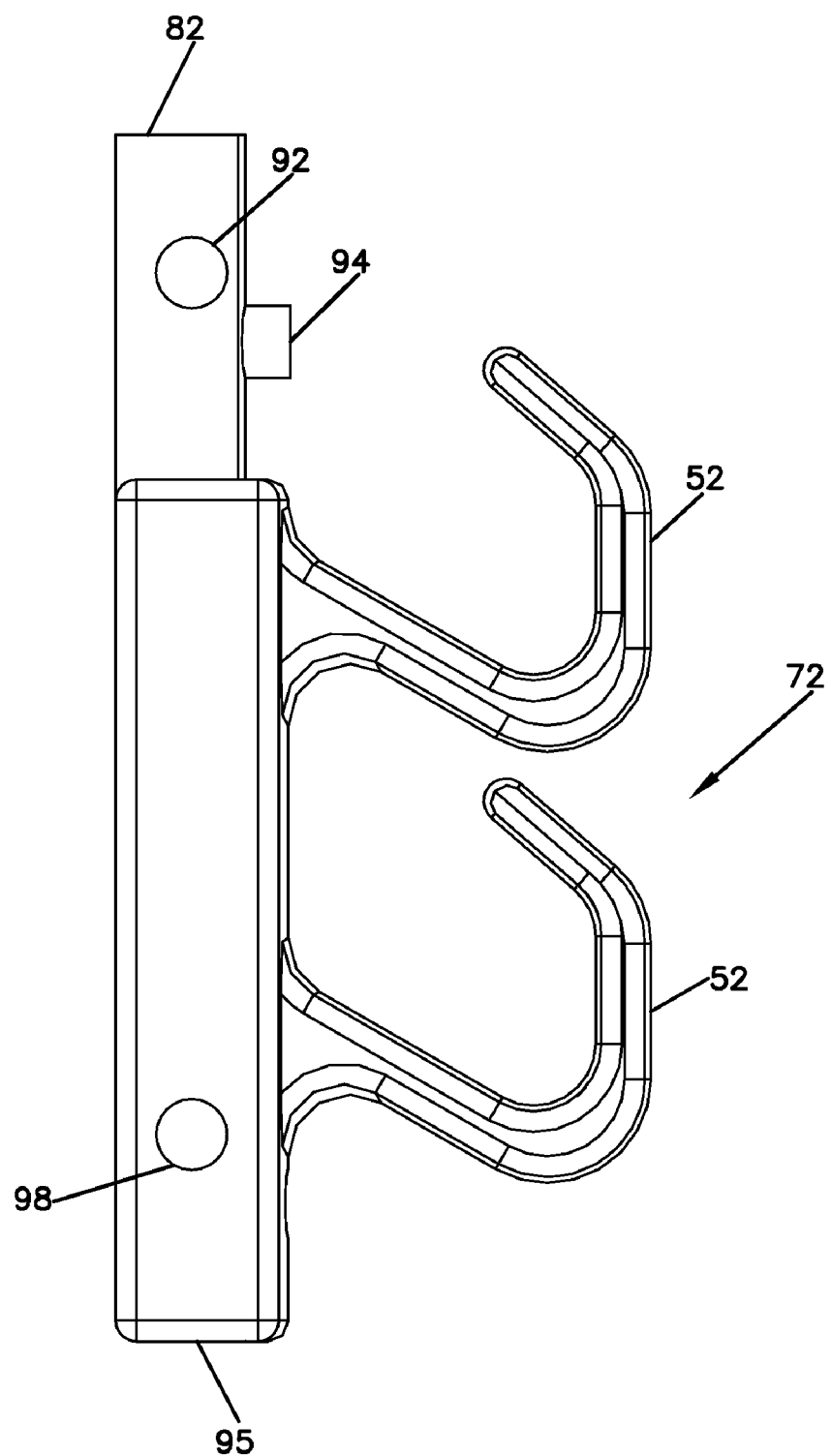
FIG. 16 is a side view of another one of the fanning strip modules used to assemble the fanning strip of FIG. 3.
Figure 17:
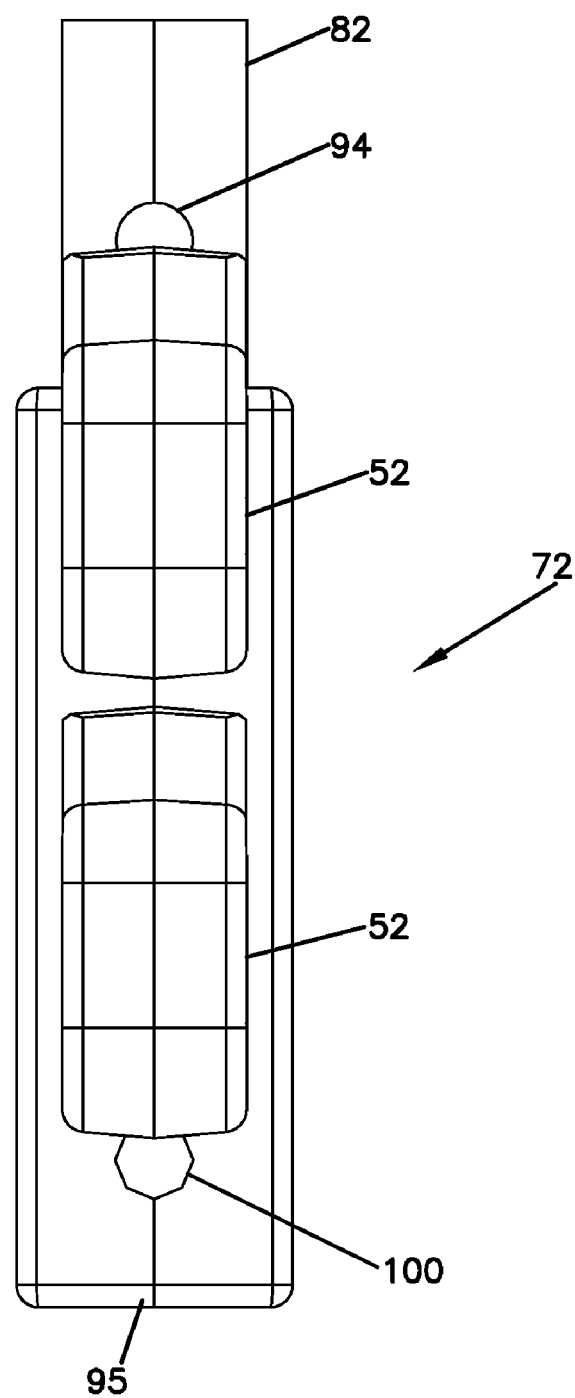
FIG. 17 is a front view of the fanning strip module of FIG. 16.
Figure 18:
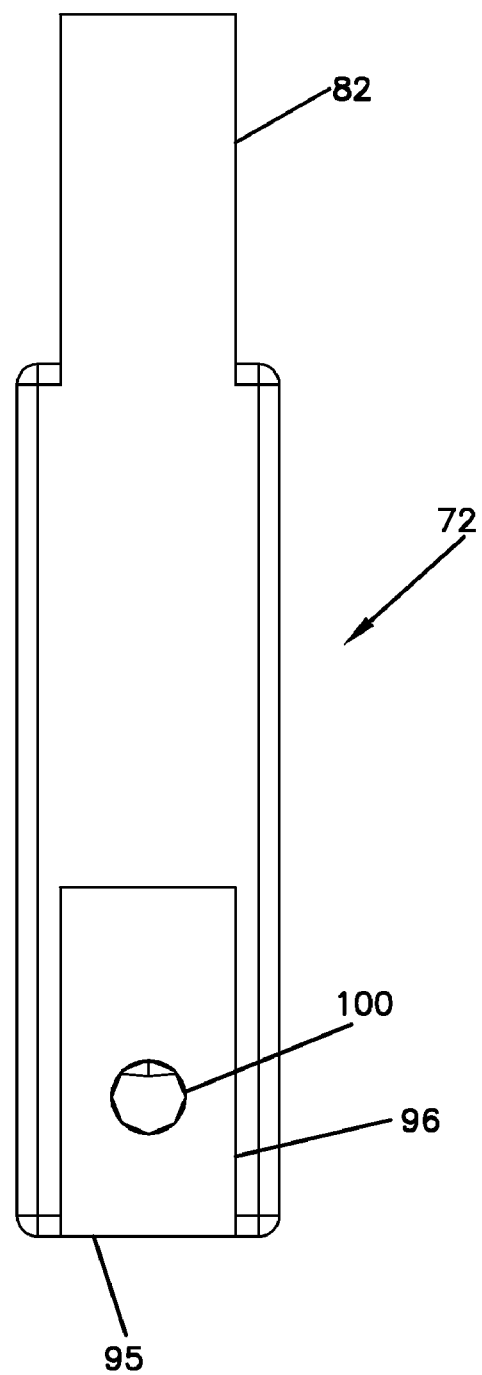
FIG. 18 is a rear view of the fanning strip module of FIG. 16.
Figure 19:
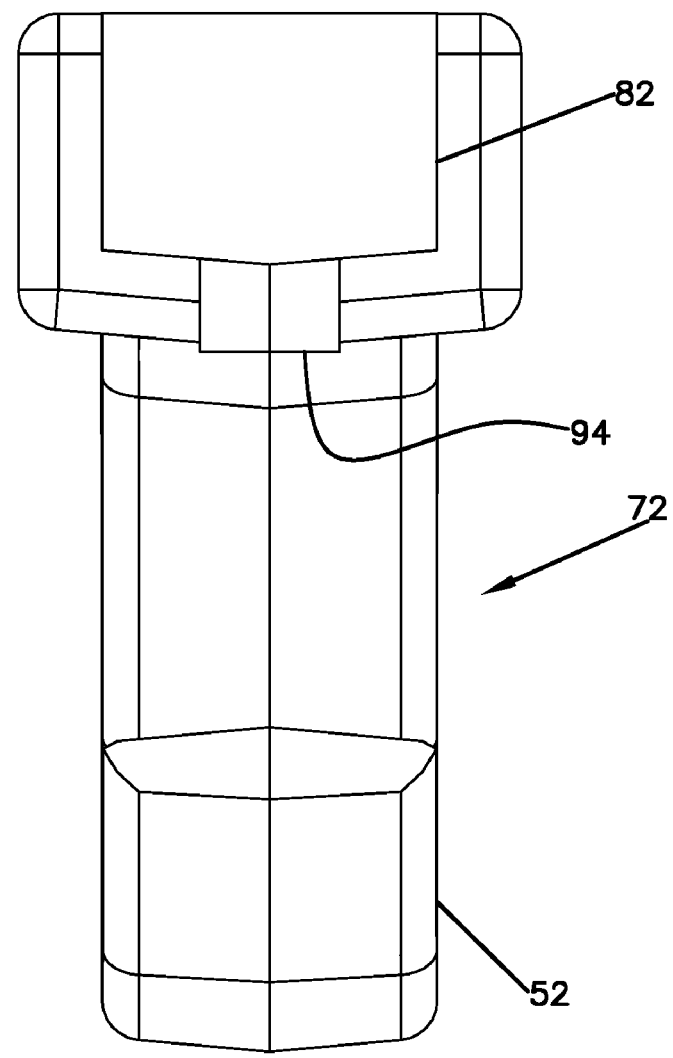
FIG. 19 is a top view of the fanning strip module of FIG. 16.
Figure 20:
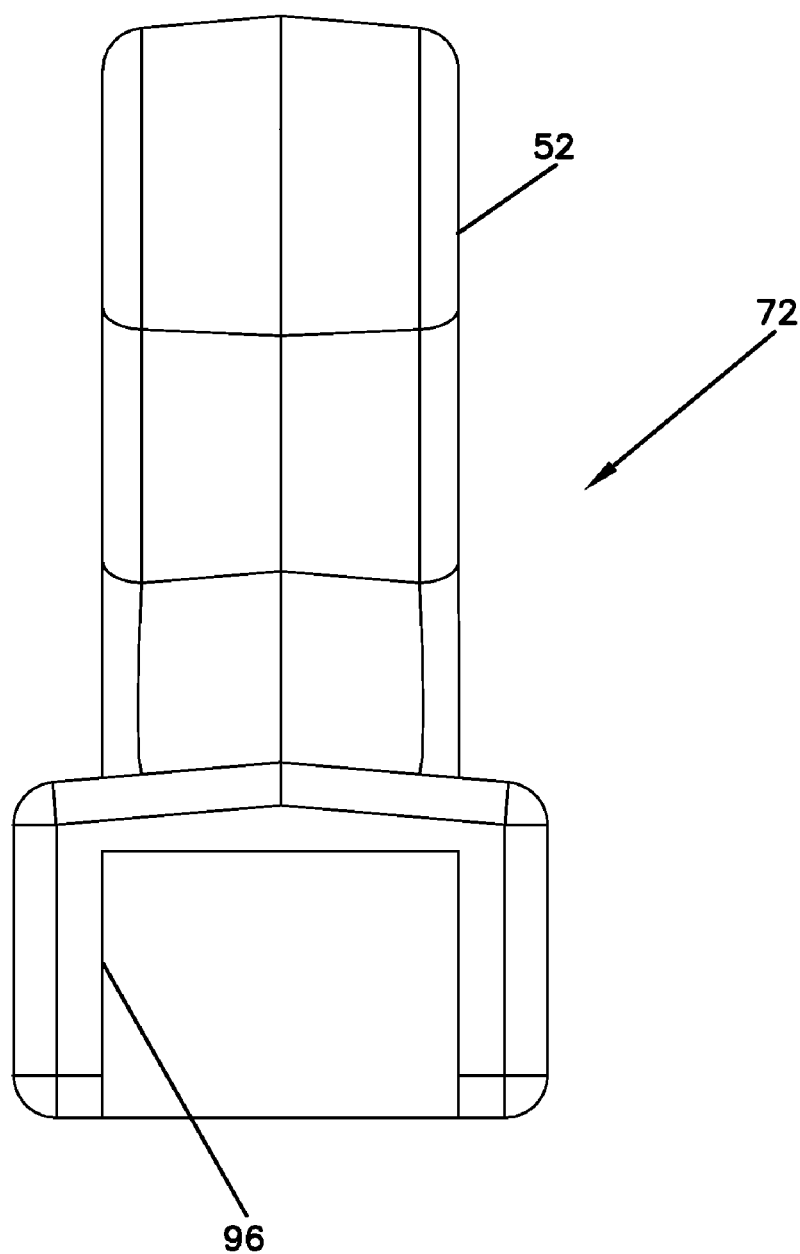
FIG. 20 is a bottom view of the fanning strip module of FIG. 16.

In use, the fanning modules are aligned in a series along a longitudinal axis 46 (e.g., see FIGS. 3 and 10). The pocket 96 of the front fanning module receives the tip 82 and surrounds the sides 84, 86, 88 of the subsequent fanning module 70, 72. For example, in the illustrated embodiment shown in FIG. 10, the post 94 of the second example fanning module 72 is received in the front hole 100 of the left-most first example fanning modules 70 (see FIG. 3). Side holes 98 of the left-most first example fanning module 70 align with tip holes 92 of the second example fanning module 72 for receipt of a fastener, if desired. The post 94 of the right-most first example fanning module 70 is received in the front hole 100 of the second example fanning module 72 (see FIG. 3). Side holes 98 of the second example fanning module 72 align with tip holes 92 of the right-most first example fanning module 72 for receipt of a fastener, if desired.

With interlocking arrangement 80 provided between each adjacent fanning module 70, 72, a variety of lengths of fanning strips 40 can be achieved. For example, in accordance with one embodiment, the second fanning module 72 includes two hooks 52 and has a length of 1.75 inches, which correspond to one rack unit (RU), which is a common dimension in the telecommunications industry. Fanning module 70 has a two RU length and includes four fingers. Accordingly, an example three RU fanning strip can be assembled by using one fanning module 70 and one fanning module 72. An example four RU fanning strip 40 can be assembled with two fanning modules 70. The length A of the example fanning strip 40 illustrated in the Figures is five RU.

In this manner, fanning strips 40 of a variety of lengths can be provided without separately manufacturing and stocking each length for panels 10 having 1-5 RU or more. Further, a standard length cut to size is not necessary either, thereby saving product waste cut from the length needed.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A fanning device comprising:
   a first fanning module including cable retainers extending outwardly from a first base, the first base having a first length extending from a first end to a second end, the first end of the first base defining a first projection and the second end defining a first pocket; and
   a second fanning module including cable retainers extending outwardly from a second base, the second base having a second length extending from a first end to a second end, the first end of the second base defining a second projection and the second end defining a second pocket;
   wherein the second projection includes a first post;
   wherein the first pocket defines a first opening; and
   wherein the second fanning module is configured to mate with the first fanning module by extending the first post into the first opening when the second projection is positioned in the first pocket.

2. The fanning device of claim 1, wherein the second projection includes a first fastener hole and wherein the first pocket includes a second fastener hole in alignment with the first fastener hole.

3. The fanning device of claim 1, further comprising:
   a third fanning module including cable retainers extending outwardly from a third base, the third base having a first end and a second end, the first end of the third base defining a third projection and the second end of the third base defining a third pocket;
   wherein the third pocket defines a second opening;
   wherein the first projection includes a second post; and
   wherein the third fanning module is configured to mate with the first fanning module by extending the second post into the second opening when the first projection is positioned in the third pocket.

4. The fanning device of claim 1, wherein the first and second lengths are the same.

5. The fanning device of claim 1, wherein the first and second lengths are different.

6. A telecommunications panel comprising:
a panel surface for mounting fiber optic terminations;
a fanning strip mounted to the panel surface, the fanning strip including a plurality of fanning modules arranged in a line, each fanning module including:
an elongated base extending in a linear direction defining a longitudinal axis, the base having a first end and an opposite second end;
a plurality of cable retainers extending from the base, wherein each cable retainer includes a finger extending from the base to a distal end;
the first end defining a projection extending in a longitudinal direction parallel to the longitudinal axis, wherein the projection includes a post extending in a transverse direction to the longitudinal axis;
the second end defining a pocket sized to receive the projection, wherein the pocket defines an opening;
the first and second ends of the base defining an interlocking arrangement having reciprocal shapes, wherein the fanning module is mateable with another fanning module on one of the other of the first and second ends having a reciprocal shape by positioning the projection in the pocket and extending the post into the opening.

7. A cable management fanning module comprising:
an elongated base extending in a linear direction defining a longitudinal axis, the base having a first end and an opposite second end;
a plurality of cable retainers extending from the base, wherein each cable retainer includes a finger extending from the base to a distal end;
the first end defining a projection extending in a longitudinal direction parallel to the longitudinal axis, wherein the projection includes a post;
the second end defining a pocket sized to receive the projection, wherein the pocket defines an opening;
the first and second ends of the base defining an interlocking arrangement having complementary shapes, wherein the fanning module is mateable with a second fanning module by engaging the complementarily shaped ends of the fanning modules by positioning the projection in the pocket and extending the post into the opening.

8. The cable management fanning module of claim 7, wherein the projection has three sides, wherein one of the sides includes the post, and wherein the other two sides each defines a first side hole in alignment with each other, and wherein the pocket defines the opening sized to receive the post, and two second side holes in alignment with each other, the first side holes and the second side holes in alignment when the pocket receives the projection.

9. The cable management fanning module of claim 7, wherein the base has a length of one rack unit (RU).

10. The cable management fanning module of claim 7, wherein the base has a length of two rack units (RU).

11. A cable management fanning module comprising:
an elongated base extending in a linear direction defining a longitudinal axis, the base having a first end and an opposite second end;
a plurality of cable retainers extending from the base, wherein each cable retainer includes a finger extending from the base to a distal end;
wherein the first end of the base has a projection extending in a longitudinal direction and having a smaller profile than a remainder of the base, wherein the projection has three sides, wherein one of the sides includes a post, and wherein the other two sides each defines a first side hole in alignment with each other; and
wherein the second end of the base defines a pocket sized to receive the projection, and wherein the pocket defines a top opening sized to receive the post and two second side holes in alignment with each other.

12. A method of assembling a cable management fanning strip comprising:
selecting at least first and second fanning modules from a plurality of fanning modules; and
connecting ends of the selected fanning modules together to create a fanning strip having a desired length, wherein an end of the first fanning module defines a projection, the projection having or defining one of a post or an opening, which is received in a pocket defined by the second fanning module, the pocket having or defining the other of a post or an opening, wherein the post is received by the opening.

13. The method of claim 12, wherein each of the fanning modules of the plurality has a length of at least one rack unit (RU).

14. The method of claim 13, wherein at least some of the fanning modules have a length of at least two rack units (RU).

15. The method of claim 12, further comprising mounting the connected fanning modules to a panel, including passing a fastener through at least a portion of the panel, the pocket and the projection.

* * * * *